UNITED STATES PATENT OFFICE.

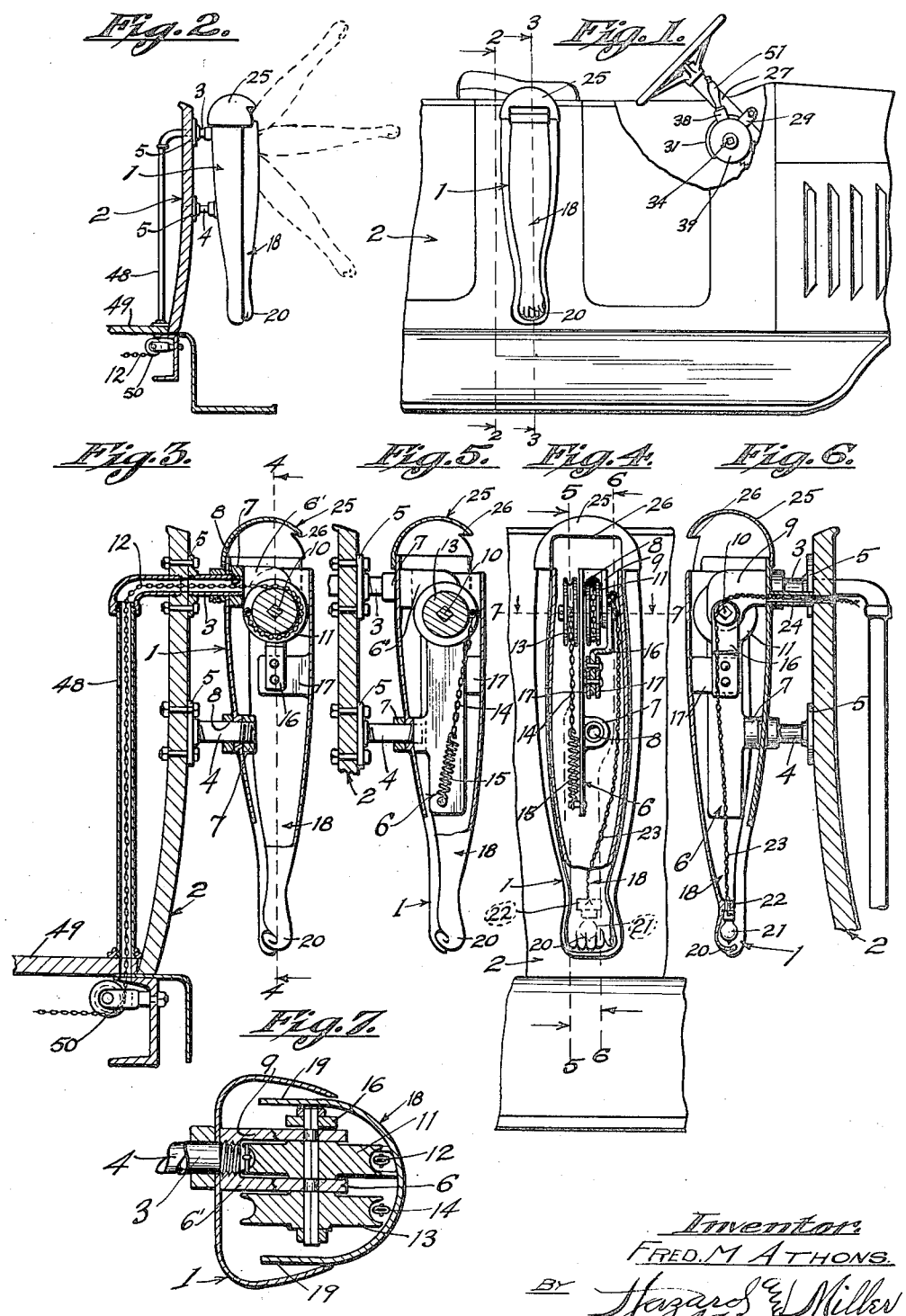

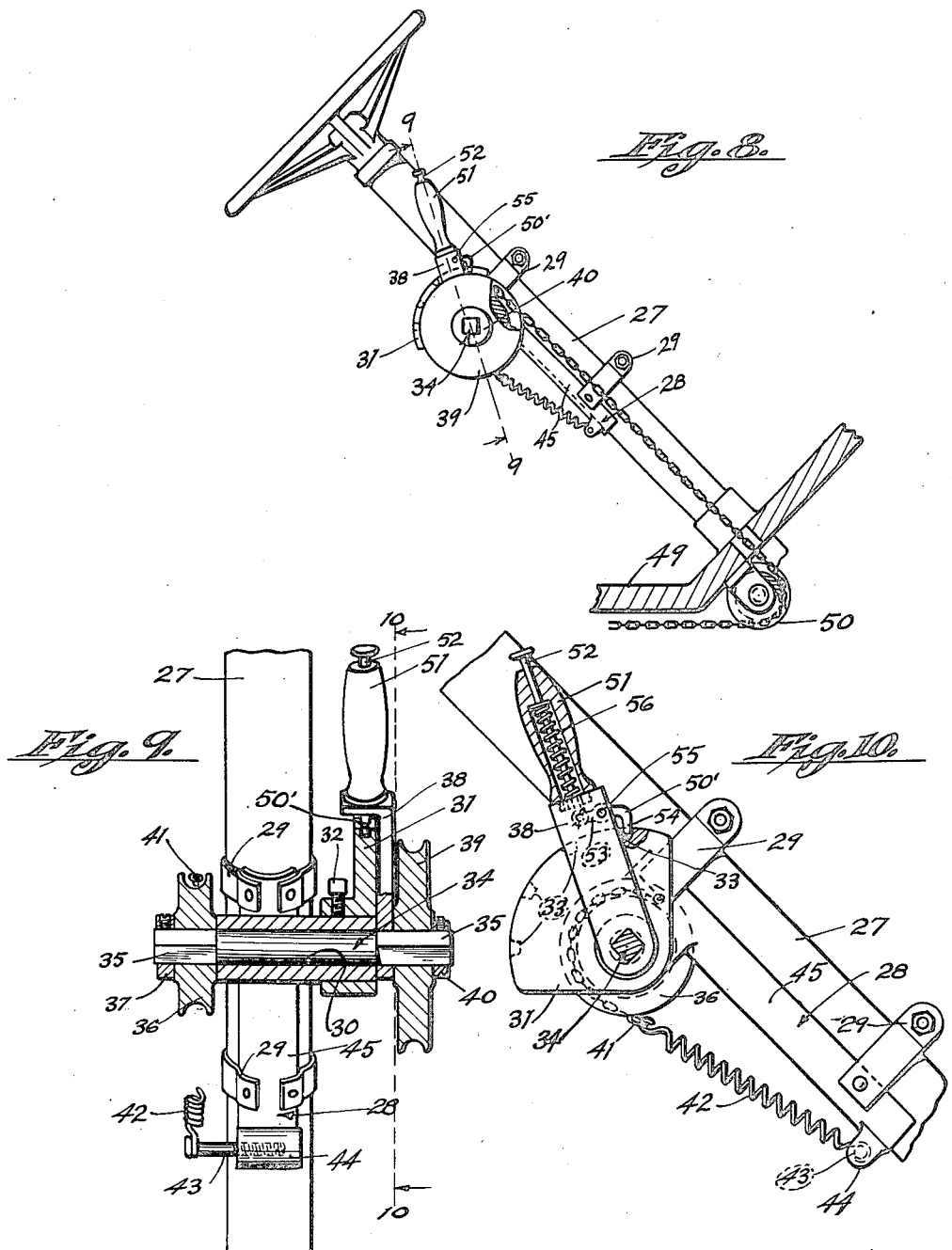

FRED M. ATHONS, OF LOS ANGELES, CALIFORNIA.

DIRECTION INDICATOR FOR MOTOR VEHICLES.

1,422,330.   Specification of Letters Patent.   Patented July 11, 1922.

Application filed June 2, 1920. Serial No. 386,010.

*To all whom it may concern:*

Be it known that I, FRED M. ATHONS, a citizen of the United States, residing at Los Angeles, in the county of Los Angeles and State of California, have invented new and useful Improvements in Direction Indicators for Motor Vehicles, of which the following is a specification.

This invention is a direction indicator for motor vehicles and the like and has for its object the provision of an indicator controlled by the driver of the machine and arranged to be swung into any one of a plurality of signalling positions.

More specifically it is the object of the invention to provide a balanced construction between the swinging indicator arm and the actuating mechanism therefor so arranged as to retain the indicator arm in any one of its signalling positions and to firmly hold said indicator arm against vibration.

The invention will be readily understood from the following description of the accompanying drawings, in which—

Figure 1 is a side elevation of a portion of an automobile having the improved direction indicator applied thereto.

Fig. 2 is a transverse section on the line 2—2 of Fig. 1.

Fig. 3 is an enlarged transverse section on the line 3—3 of Fig. 1.

Fig. 4 is a longitudinal section on the line 4—4 of Fig. 3.

Fig. 5 is a longitudinal section on the line 5—5 of Fig. 4.

Fig. 6 is a longitudinal section on the line 6—6 of Fig. 4.

Fig. 7 is a transverse section on the line 7—7 of Fig. 4.

Fig. 8 is a side elevation of the steering post of an automobile having the actuating mechanism for the direction indicator mounted thereon.

Fig. 9 is a transverse section on the line 9—9 of Fig. 8.

Fig. 10 is a transverse section on the line 10—10 of Fig. 9.

The direction indicator comprises a casing, preferably, mounted upon the outside of the body of the automobile and extending in upright position. An arm is pivoted to this bracket arm and is arranged to be swung outwardly therefrom into any one of a plurality of signalling positions. A flexible connection extends from this swinging arm through the wall of the body of the automobile and through a suitable guideway to the steering post of the automobile. Suitable actuating mechanism is provided upon the steering post for manually exerting pull upon the flexible connection so as to swing the indicator arm into a desired one of its signalling positions.

Referring specifically to the parts as thus set forth, the stationary casing which is mounted upon the outside of the body of the automobile is shown as a transversely curved strip 1 extending in upright position outside of the wall 2 of the body of the automobile. This casing may be held in position by hollow supporting arms 3 and 4 mounted upon the wall 2 in base plates 5 and projecting outwardly beyond said wall. A brace 6 extends longitudinally within the casing strip 1 at the upper end thereof, this casing being provided with threaded lugs 7 arranged in alinement with openings 8 extending through the casing. The hollow supporting arms 3 and 4 are arranged to project through the openings 8 and to engage the lugs of brace $6^x$ for positioning the same relative to casing 1 and for supporting the latter from the wall of the body of the automobile.

The brace 6 depends at its upper end 6' from one arm of a bifurcated extension 9 forming bearings. A squared shaft 10 is journaled in these bearings and projects beyond the same. A pulley 11 is fixed upon the shaft 10 between the bearings and a flexible connection shown as a cable 12 is secured at one end to this pulley. The cable passes around the pulley and thence through the hollow supporting arm 3.

A second pulley 13 is fixed upon shaft 10, preferably, beyond the bifurcated extension 9 and a flexible connection shown as a cable 14 is secured at one end to this pulley and at its opposite end to one end of a spring shown as a coil spring 15, the opposite end of which is secured to the lower end of brace 6. A support 16 is fixed upon shaft 10 beyond the bifurcated extension 9, said support extending downwardly below pulleys 11 and 13 and being connected to lugs 17 provided upon the swinging indicator arm. This swinging indicator arm is shown as comprising a strip 18 extending the length of casing 1 and, preferably, suitably transversely curved so as to close the open channel formed by the transversely curved casing strip 1 with the side edges of the indicator arm shown at 19 extending within the channel of the casing strip. The lugs 17 project inwardly from the indicator arm, the parts being so arranged that when support 16 is swung with shaft 10 the indicator arm will be swung upwardly away from the casing 1.

The indicator arm may be shaped to conform substantially to the shape of the arm and hand of a human being and illuminating means are, preferably, provided within the hand 20 of the indicator arm, said illuminating means being shown as an incandescent lamp 21 held in a suitable bracket 22 and having the wire cord 23 for the lamp extending upwardly through the arm 18 and outwardly through a suitable conduit 24 connecting an opening formed in casing 1 with a suitable opening extending through the wall of the automobile body so that the wire cord may be connected with the source of electrical energy within the automobile.

A cap 25 is, preferably, provided over the open upper end of casing 1, this cap extending over the open upper end of the indicator arm and, preferably, being provided with a recessed portion forming a stop 26 arranged to be impinged by the indicator arm when the latter is swung to its uppermost signalling position for limiting said swinging movement of the indicator arm.

The construction as thus far described provides means whereby pull exerted upon flexible cable 12 will rotate pulley 11 and thereby rotate the shaft 10 upon which the pulley is fixed. This rotation of shaft 10 will turn support 16 which is also fixed upon shaft 10 and thereby swing the indicator arm upwardly. The indicator arm is, preferably, adapted to be swung into either a horizontal position, or into a position below the horizontal, or into a position above the horizontal, these three signalling positions of the arm being adapted to denote a stop or a turn to the right or left. When the indicator arm is thus actuated the pulley 13 is turned with shaft 10 thereby winding flexible connection 14 upon said pulley and extending the spring 14 so that the tendency of said spring is to return the indicator arm to its normal position against the bracket arm 1. When the indicator arm is thus returned to normal position the tension of spring 15 is adapted to yieldably hold the indicator arm in said position so as to prevent vibration of the indicator arm relative to casing 1.

The means employed for exerting pull upon the cable 12 is shown mounted upon the steering post 27 of the automobile. As an instance of this arrangement a supporting bracket 28 is clamped around the steering post as by clamps 29, said supporting bracket being provided with a bearing opening 30 extending therethrough. An arcuate plate 31 is fixed upon the bearing bracket, preferably, by a set screw 32, and the circumference of said arcuate plate is provided with a plurality of notches 33 arranged to be engaged respectively for retaining the indicator arm in its various positions. A shaft 34 extends through the bearing 30 and is journaled therein, the ends of said shaft which project beyond the bearing bracket being, preferably, squared as shown at 35. A pulley 36 is fixed upon one of these squared ends of the shaft 34 as by a collar 37, and a lever arm 38 is fixed upon the opposite squared end of the shaft with a pulley 39 fixed upon said end of the shaft beyond the lever arm. A collar 40 upon the end of the shaft holds the lever arm and pulley in position.

A flexible connection shown as a cable 41 is secured at one end to the pulley 36 and extends around said pulley with its opposite end connected to one end of a spring 42 which is secured at its opposite end to a pin 43, preferably, threaded into a suitable lug 44 upon a longitudinal extension 45 of the bracket 28. The cable 12 leading from the indicator arm is connected at its end to the pulley 39, said cable for this purpose, preferably, extending from hollow bolt 3 through a suitable aperture in the wall of the automobile body and thence through a conduit 48 downwardly through the floor 49 of the automobile and over suitable pulleys 50 and thence upwardly through a suitable opening in the floor along the side of the steering post 27 to the pulley 39.

The spring 42 is so arranged as to yieldably urge rotation of shaft 34 in a direction to wind the end of cable 12 upon the pulley 39 for swinging the indicator arm upon its pivot against the tension of spring 15. By this arrangement it will be seen that the springs 15 and 42 provide a balanced construction wherein the tendency of said springs is to actuate the mechanism in opposite directions and thereby normally hold the indicator arm and its operating mechanism in a stationary position against vibration with the indicator arm in inoperative position.

The lever arm 38 is arranged to swing shaft 34 against the tendency of springs 15 and 42 normally holding the mechanism in stationary position so as to cause pulley 39 to be rotated in either direction. Means are provided for locking the lever arm in the various positions to which it is turned for retaining the indicator arm in its various positions. As an instance of this arrangement the lever arm is shown as extending above the notched circumference of arcuate plate 31 and a retaining dog 50′ is pivoted to the lever arm so as to removably engage any one of the series of notches 33. As an instance of this arrangement the handle 51 projects beyond lever arm 38 and a push rod 52 extends through said handle. This push rod is pivoted to one end 53 of the dog 50' which is provided with a notch engaging hook 54 at its opposite end. The dog is pivoted to the lever arm at a point 55 intermediate of its ends. A spring 56 surrounding push rod 52 within handle 51 is arranged to yieldably urge the dog into engagement with any one of the series of notches 33 upon the arcuate plate 31.

Thus it will be seen that I have provided a construction wherein an indicator arm is arranged to be locked in any one of a plurality of positions with a spring tension exerted upon said indicator arm in opposite directions for yieldably holding the arm against vibration in the position to which it has been moved. Furthermore, it will be observed that the construction which I provide forms a spring tension upon the indicator arm in opposite directions which when the locking means for the indicator arm is released will return the indicator to inoperative position and hold the same in this position against vibration.

Various changes may be made without departing from the spirit of the invention as claimed.

What is claimed is:

1. An indicator comprising a casing, bearings carried thereby, a shaft journaled in said bearings, a flexible spring connection between one of said bearings and said shaft, a semaphore having a support fixed on said shaft, and a flexible connection secured to said shaft for rotating the same.

2. An indicator comprising a casing, bearings carried thereby, a shaft journaled in said bearings, a flexible spring connection between one of said bearings and said shaft, a semaphore having a support fixed on said shaft, a flexible connection secured to said shaft for rotating the same, an operating shaft having the opposite end of said flexible connection received over the same, and spring means at the last mentioned end of said flexible connection.

3. An indicator comprising a casing, bearings carried thereby, a rotatable shaft, spring means for rotating said shaft in one direction, a semaphore fixed on said shaft, a flexible connection secured to said shaft for rotating the same against the tendency of said spring, an operating shaft having the opposite end of said flexible connection received over the same, spring means at the last mentioned end of said flexible connection, and means for locking said operating shaft in rotatably adjusted positions.

In testimony whereof I have signed my name to this specification.

FRED M. ATHONS.